April 23, 1935.  L. A. CAMEROTA  1,999,084
PACKING RING FOR PIPE JOINTS
Filed Aug. 10, 1933
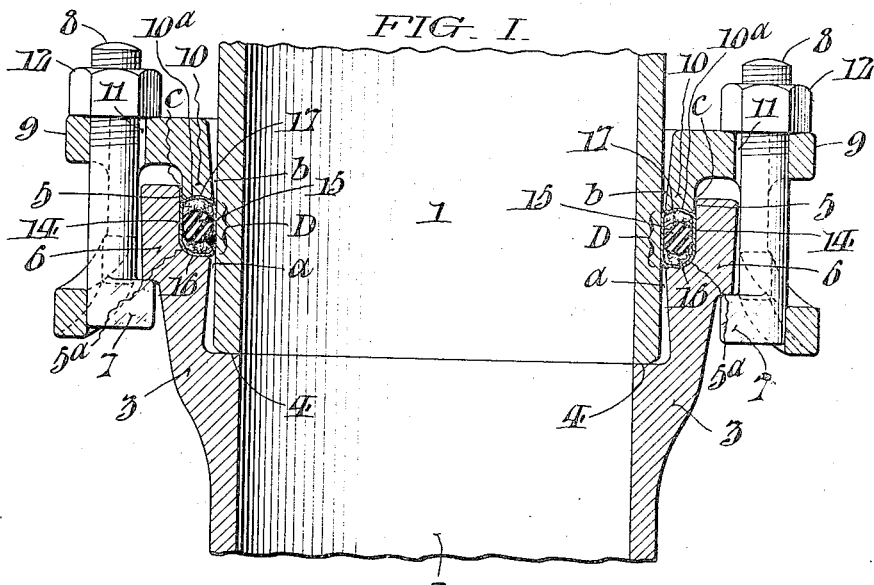
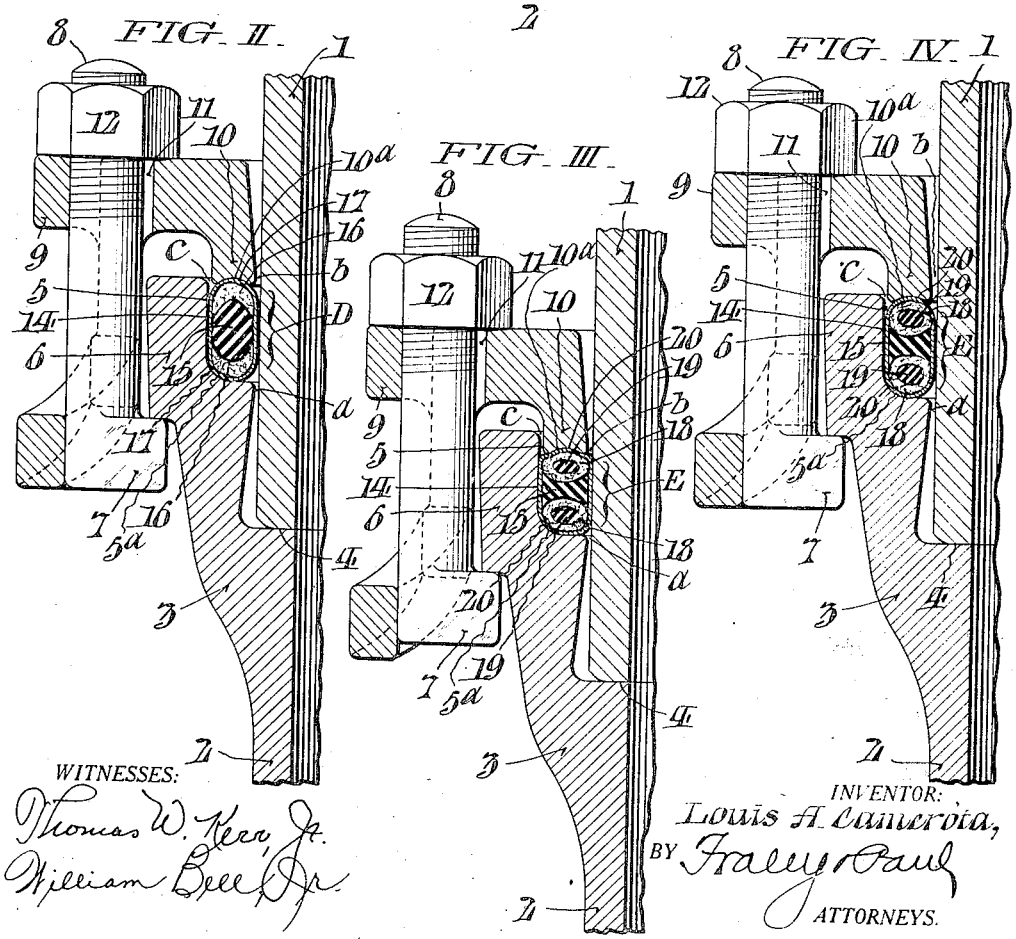

Patented Apr. 23, 1935

1,999,084

UNITED STATES PATENT OFFICE 1,999,084

PACKING RING FOR PIPE JOINTS

Louis A. Camerota, Burlington, N. J., assignor, by mesne assignments, to Florence Pipe Foundry & Machine Company, Florence, N. J., a corporation of New Jersey Application August 10, 1933, Serial No. 684,488

11 Claims. (Cl. 288—1)

This invention relates to packing rings for pipe joints or the like, and is particularly useful in its application to pipe joints characterized by bell and spigot ends defining an annular cavity within which the packing ring is interposed. Heretofore many forms of pipe joints of the bell-and-spigot type have been used in which a packing ring of substantially triangular or polygonal cross section is adapted to be wedged between the adjoining pipe sections to serve as a sealing member. Such pipe joints have for the most part been satisfactory except where the joint is subjected to severe bending stresses tending to cause relative flexure between the pipe sections, with consequent changing cross sectional shape of the cavity within which the packing ring is compressed.

One difficulty that has been experienced with such pipe joints is that the compression of the packing ring causes the material thereof to flow or be extruded into the crevices between the elements which define the packing ring cavity. Such cold flow of the material frequently causes its permanent distortion, destroying the capacity of the packing ring to resume its original shape. The portions of the ring which have thus been extruded into the crevices of the joint are pinched or squeezed; and with bending of the adjoining pipe sections, the extended portions are eventually cut and may be completely severed from the body of the packing ring.

While attempts have been made to reinforce packing rings with relatively stiff material at the critical surfaces which are subjected to a pinching action, these attempts have not been altogether successful, for the reinforcing elements, unless firmly embedded in the body of the ring, will become detached from the body; and where the reinforcing elements are disposed within the interior of the packing ring body at a distance from the critical surfaces, the surface material will still be subjected to pinching and cutting.

Another difficulty that has been experienced with packing rings which are reinforced at the critical surfaces is that the reinforcements do not withstand the corrosive or disintegrating effect of oils, gases, acids, or the like in the pipe line or exteriorly thereof, but deteriorate rapidly in service.

Still another disadvantage of pipe joints constructed as heretofore with wedge shaped hollows for the packings is that, incident to assembling and compression of the packings, the two interfitted pipe sections become axially disaligned. As a consequence, there is metal to metal contact of the pipe sections at one side of the joints with formation of an imperfect seal and development of leaks at such regions.

The object of my present invention is to overcome the above recited difficulties by the provision of a novel form of pipe joint with a packing ring which, by virtue of affording a large reinforced surface or surfaces for distribution of the load imposed upon it, will resist cold flow of the material at the crevices of the joint; which will not disintegrate incident to repeated bending of the elements of the joint, but will form an effective seal for a long period of service and which will insure accurate alignment as between the spigot and bell ends of the pipe.

Other more specific objects and advantages characteristic of my invention will become apparent from the description hereinafter set forth of several embodiments or examples of the practice of the invention, having reference to the accompanying drawing.

Of the drawing:

Fig. I represents a cross section of a pipe joint constructed in the manner of my invention, and showing one form of packing ring compressed in the joint.

Fig. II represents an enlarged fragmentary cross section showing the packing ring and its cavity before the joint is tightened.

Fig. III represents a view similar to Fig. II, but showing a modified form of packing ring after compression; and, Fig. IV represents a similar view showing the modified form of packing ring before compression.

With reference to Fig. I of the drawing, there is shown at 1 the spigot or plain end of one pipe section, and there is shown at 2 the bell end of an adjoining pipe section. The bell end 2 is enlarged or expanded at 3 and formed at the inside with a shoulder or seat 4 for abutment of the spigot end 1 of the other pipe section. The bell end 2 has at its mouth an annular cavity 5 adjacent to and surounding a portion of the outer surface of the spigot end 1, the said cavity being rounded at the bottom as at 5a. Moreover, the bell end 2 terminates in an annular flange 6 engaged by lugs 7 on the ends of clamp bolts 8.

Extending around the spigot end 1 there is a clamping member 9 in the form of a ring having a pendant flange portion 10 projecting in the direction of the longitudinal axis of the joint which is adapted to enter between the flange 6 of the bell member 2 and the outer surface of the spigot member 1, the edge of the flange 10 being concaved as at 10a. The clamping ring 9 is provided with a series of spaced holes 11 for the reception of the bolts 8 which have threaded ends with nuts 12 applied thereto. When the bolts 8 are inserted through the holes 11 of the clamping ring 9 by tightening the nuts 12, the clamping ring 9 is forced in the direction of the longitudinal axis of the joint toward the mouth of the bell member 2 into the annular cavity 5.

It will be observed that the annular cavity 5 defined by the spigot member 1, the bell member 2 and the clamping ring 9 is relatively wide, straight sided, and rounded top and bottom, and uninterrupted except at three regions where there are crevices for easement of the joint, one such crevice at the base of the cavity being designated at A, and the two crevices at the inner and outer side of the portion 10 of the clamping ring being designated, respectively, at b and c. While the cross sectional shape of the annular cavity 5 admits of considerable variation, it is desirable to avoid sharp corners and to have a flat wall as indicated at 14 opposed to and substantially parallel with the outer surface of the spigot member 1.

In Figs. I and II of the drawing, there is represented one form of packing ring D embodying my invention, the ring being shown in Fig. I in the shape which it assumes after compression in the pipe joint. The packing ring D is substantially of oval cross sectional shape, although its exterior shape, as well as the shape of the cavity 5 within which it is inserted, may be varied to considerable extent provided that sharp angles or corners are avoided. The body 15 of the packing ring D is of resilient or yielding material, such as rubber, and has incorporated therewith at opposite ends reinforcing elements 16 which closely follow the surface contour of the curved ends of the packing ring. The reinforcing elements 16 may be impregnated with the material of the body portion or joined thereto with a firm bond. Preferably the body 15 and the reinforcing elements 16 are covered with a relatively thin layer of a suitable material as indicated at 17, which is immune against corrosion or disintegration by oils, gases, acids or the like in the pipe line or exteriorly thereof. The material of which the thin protective covering 17 is made will necessarily depend upon the nature of the fluid in the pipe line, but for most purposes the material known commercially as "thiokol" has been found satisfactory. Each reinforcing element 16 is of arched cross sectional shape, as represented in Fig. II, and is sufficiently stiff to avoid sharp distortion at any point when the packing ring D is subjected to endwise compression. Layers of canvas may be employed to make up the reinforcing elements, or wire mesh fabric or other material of the required stiffness may also be utilized. The material, however, should be of such character that the reinforcing elements 16 flex to a certain extent when the packing ring is placed under compression, with resulting expansion of the resilient body 15 at the sides of the packing ring.

When the packing ring D is compressed, as represented in Fig. I, it will be observed that the reinforcing elements 16 are gradually flattened without sharp distortion at the crevices a, b and c, and that the reinforcing elements bridge the crevices in such manner that there is no opportunity for the body 15 of resilient material to be sharply distorted at these regions. Moreover, the effect of tightening the nuts 12 on the bolts 8 is to draw the clamping ring 9 into the mouth of the bell end 2 and to expand the resilient body 15 in a direction toward the outer surface of the spigot member 1 and toward the opposed wall 14 of the bell member 2, forming a tight seal at the sides of the packing ring. By distribution of the compression load over a comparatively large area of the reinforcements 16, it will be seen that cold flow of the packing is effectively prevented.

In Figs. III and IV there is represented a modified form of packing ring E having a body portion 15 of resilient material, such as rubber, and having pairs of arched reinforcing elements 18 at its opposite curved ends. In this example of the practice of my invention, at each end of the packing ring E two semi-circular or arched reinforcing elements are joined together to form a substantially cylindric reinforcement when the packing ring is in its natural shape, and the interior of each cylinder is filled with the resilient body material, as indicated at 19. Incident to compression of the packing ring E, the reinforcing elements 18 are flattened so that each element assumes a substantially elliptic shape. The resilient body 15 is also in this case expanded laterally when the packing ring is compressed against the outer surface of the spigot member 1 and against the flat wall 14 of the bell member 2. Thus, here again, there is no sharp distortion of the reinforcing elements 18 at the regions where the crevices a, b and c are bridged. As shown, the packing ring E is provided with a thin protective covering 20 of a material like that described in connection with the first embodiment of my invention.

It will be observed that the packing rings herein described avoid the difficulties heretofore experienced with wedge shaped packing rings which are forced into narrow crevices incident to the tightening up of a pipe joint, and which are subjected to a cutting action incident to bending of the elements of the joint. Furthermore, it will be observed that the packing ring of my invention is self-seating in the cavity within which it is inserted in the sense that no particular care need be exercised as to the initial position of the packing ring when inserted. While the packing rings herein described are free of the disadvantages characteristic of older forms of packing rings, they nevertheless serve to effect a tight seal between the elements of a pipe joint, and they assist in rendering the joint flexible in character. Due to the hereinbefore described novel construction of the bell end of the pipe and by virtue of the exact conformity of the preformed gaskets packing to the straight sided annular cavity formed jointly with the spigot end, the two joint parts are of necessity accurately aligned incident to assembling. In other words, the packing is self centering and thus operates as a means to initially align the pipe ends and to so maintain them subsequently with preclusion of the possibility of leakage in the joint.

While I have described several examples of the practice of my invention with reference to one specific form of pipe joint and two specific forms of packing rings embraced thereby, it is to be understood that various changes may be made in the shape and material of the packing ring and its cavity; and that the packing ring of this invention may be employed to advantage for other purposes than for pipe joints all without departing from the spirit of my invention as defined in the annexed claims.

Having thus described my invention, I claim:

1. A packing for pipe joints or the like comprising a ring having a body of yielding material, and having an arched reinforcing element closely following the exterior contour of the ring near a portion of its surface and impregnated with the body material in such manner as to be firmly bonded thereto, said reinforcing element being of such stiffness as to resist sharp distortion and of such flexibility that it will gradually flatten when the ring is placed under compression with incidental expansion of the yielding body at the non-reinforced portions of its surface.

2. A packing for pipe joints or the like comprising a ring of substantially oval cross section having a body of resilient material and having incurved arched reinforcing elements embedded within and inseparably bonded to said body at opposite ends thereof, said reinforcing elements being of such flexibility that when the ring is placed under endwise compression they will gradually flatten with avoidance of sharp distortion and with incidental expansion of the body material at the sides of the ring.

3. A packing for pipe joints or the like comprising a ring of substantially oval cross section having a body of resilient material and having arched reinforcing elements inseparably bonded to and embedded with said body adjacent opposite curved ends thereof, said reinforcing elements following the surface contour of said curved ends and being of such flexibility that when the ring is placed under endwise compression they will gradually flatten with avoidance of sharp bending and with incidental expansion of the body material at the sides of the ring.

4. A packing for pipe joints or the like comprising a ring having a body of resilient material and having arched reinforcing elements embedded therein at opposite ends and closely following the surface contour of the ring at said ends, said reinforcing elements being of such flexibility that they will gradually flatten when the ring is placed under compression, and a thin corrosive resistant protective covering of plastic material surrounding the ends of said packing in close proximity to said reinforcing elements.

5. A packing for pipe joints or the like comprising a ring having a body of resilient material and having a smoothly curved reinforcing element embedded therein and closely following the surface contour of the ring at one end thereof, said reinforcing element being of such stiffness as to resist sharp distortion and being inseparably bonded to the body material so as to flex in the manner of an elliptic spring when the ring is placed under varying degrees of endwise compression.

6. A packing for pipe joints or the like comprising a ring of substantially oval cross section having a body of resilient material and having reinforcing elements of substantially cylindric cross sectional form embedded within said body and bonded thereto at its opposite curved ends and centrally filled with the resilient material, said reinforcing elements following the surface contour of said curved ends and being of such flexibility that they will gradually flatten when the ring is placed under endwise compression.

7. In a pipe joint including bell and spigot ends and a clamp member defining an annular cavity, a packing ring in said cavity comprising a body of yielding material having an arched reinforcing element closely following the exterior contour of the ring near a portion of its surface and impregnated with the body material in such manner as to be firmly bonded thereto, said reinforcing element bridging the crevices of said cavity between said bell and spigot ends and said clamp member, and said reinforcing element being adapted to flex when the clamp member is tightened with incidental expansion of the yielding body fluid-tight against the walls of said bell and spigot members.

8. In a pipe joint including bell and spigot ends and a clamp member defining an annular cavity, a packing in said cavity comprising a body of resilient material having an arched reinforcing element incorporated therein and serving to bridge the crevices of said cavity between said bell and spigot ends and said clamp member, said reinforcing element being adapted to flex in the manner of an elliptic spring when the clamp member is tightened with incidental expansion of the resilient body against the walls of said bell and spigot members.

9. In a pipe joint including bell and spigot ends and a clamp member defining an annular cavity, a packing in said cavity comprising a ring of oval cross section having a body of resilient material and having smoothly curved reinforcing elements embedded therein at opposite ends and bridging the crevices of said cavity between said bell and spigot ends and said clamp member, said reinforcing elements being adapted to flex when the clamp member is tightened, with incidental expansion of the non-reinforced sides of said packing ring against the walls of said bell and spigot members, and said packing ring having a relatively thin corrosion-resistive protective covering of plastic material in close proximity to said reinforcing elements at the crevices of the cavity and restrained by said elements against extrusion into said crevices.

10. In a pipe joint including bell and spigot ends and a clamp member defining a relatively wide annular cavity with parallel vertical sides and rounded top and bottom, a packing in said cavity comprising a ring of corresponding cross section having a straight sided body of resilient material and having smoothly curved reinforcing elements incorporated therewith at opposite ends to bridge the crevices of said cavity between said bell and spigot ends and said clamp member, said reinforcing elements being of such stiffness as to resist sharp distortion and being adapted to flex when the clamp member is tightened with incidental expansion of the yielding body fluid tight against the walls of said bell and spigot members, and said reinforcing elements being impregnated with the body material so as to partake of its tendency to assume its original shape.

11. In a pipe joint including bell and spigot members and a clamp member defining a relatively wide annular cavity with parallel vertical sides and rounded top and bottom, a packing in said cavity comprising a ring of corresponding cross section with a straight sided body of resilient material, and having reinforcing elements of substantially cylindric cross sectional form embedded in said body and centrally filled with the resilient material, with their outer surfaces bridging the crevices between said bell and spigot ends and said clamp member, said reinforcing elements being adapted to flex when the clamp member is tightened, without sharp bending at the regions of said crevices and with incidental expansion of the yielding body fluid tight against the walls of said bell and spigot members, and said reinforcing elements being impregnated with the body material so as to partake of its tendency to assume its original shape.

LOUIS A. CAMEROTA.